United States Patent
Lu et al.

(10) Patent No.: US 11,476,723 B2
(45) Date of Patent: Oct. 18, 2022

(54) WIRELESS CHARGING MOUSE AND METHOD OF CHARGING THE SAME

(71) Applicants: DEXIN ELECTRONIC LTD., Guangdong (CN); DEXIN CORPORATION, New Taipei (TW)

(72) Inventors: Ho-Lung Lu, New Taipei (TW); Shu-Sheng Chen, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 135 days.

(21) Appl. No.: 16/910,072

(22) Filed: Jun. 24, 2020

(65) Prior Publication Data
US 2021/0218288 A1 Jul. 15, 2021

(30) Foreign Application Priority Data
Jan. 15, 2020 (TW) ................... 109101281

(51) Int. Cl.
*H02J 50/80* (2016.01)
*H02J 50/90* (2016.01)
*H02J 50/10* (2016.01)

(52) U.S. Cl.
CPC ............. *H02J 50/80* (2016.02); *H02J 50/10* (2016.02); *H02J 50/90* (2016.02)

(58) Field of Classification Search
CPC ...................................... H02J 50/80
USPC ........................................ 320/108
See application file for complete search history.

(56) References Cited

U.S. PATENT DOCUMENTS

| | | | |
|---|---|---|---|
| 2003/0048254 A1* | 3/2003 | Huang ................ | G06F 3/03543 345/163 |
| 2011/0210696 A1* | 9/2011 | Inoue ..................... | H02J 50/12 320/108 |
| 2014/0159654 A1* | 6/2014 | Lee ....................... | H02J 7/0029 320/108 |
| 2015/0340877 A1* | 11/2015 | Lin ....................... | H02J 50/10 307/104 |
| 2020/0021138 A1* | 1/2020 | Yeo ....................... | H02J 50/60 |

* cited by examiner

*Primary Examiner* — Edward Tso
*Assistant Examiner* — Ahmed H Omar
(74) *Attorney, Agent, or Firm* — Li & Cai Intellectual Property Office

(57) ABSTRACT

A wireless charging mouse and a method of charging the same are provided. The wireless charging mouse includes a first wireless power receiver, a second wireless power receiver, a conversion circuit, and a control circuit. The first wireless power receiver has a first wireless charging circuit, and the first wireless power receiver receives a wireless power supply of a first wireless power supply unit. The second wireless power receiver has a second wireless charging circuit, and the second wireless power receiver receives a wireless power supply of a second wireless power supply unit. The control circuit outputs a control signal to the conversion circuit according to the power status information received from the first wireless power receiver and the second wireless power receiver by the conversion circuit. The control circuit selectively receives at least one of the first power and the second power according to the control signal.

14 Claims, 5 Drawing Sheets

WIRELESS CHARGING MOUSE AND METHOD OF CHARGING THE SAME

CROSS-REFERENCE TO RELATED PATENT APPLICATION

This application claims the benefit of priority to Taiwan Patent Application No. 109101281, filed on Jan. 15, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wireless mouse, and more particularly to a wireless charging mouse with multiple coils and a method of charging the same.

BACKGROUND OF THE DISCLOSURE

Wireless power transmission, or wireless energy transfer, is a technology transferring power wirelessly to a device requiring power. According to different wireless charging principles, there are three main wireless charging methods: magnetic coupling (or electromagnetic induction), magnetic resonance and radio waves. Nowadays, the mainstream wireless charging standards includes: the Qi standard, the Power Matters Alliance (PMA) standard, and the Alliance For Wireless Power (A4WP) standard. The Qi standard and the PMA standard wireless charge through a magnetic coupling method, and the A4WP standard wireless charges through a magnetic resonance method.

The transfer efficiency of the Qi standard is easily affected by the size of the coils and the distance therebetween, and a short transferring distance is required to provide a better efficiency. Compared to the Qi standard, the A4WP standard has technical advantages as follows: longer transferring distance, higher transferring power, and better transferring efficiency. However, the disadvantages of the magnetic resonance method are higher cost, and that the transferring efficiency can be affected by the resonance frequency.

The commercially available wireless charging products (e.g. wireless mouse) usually only support one charging method, thus being limited in use. Therefore, the development of functions supporting stationary charging and charging while using is urgently required to meet the diverse needs of wireless charging products of consumers.

SUMMARY OF THE DISCLOSURE

In response to the above-referenced technical inadequacies, the present disclosure provides a wireless charging mouse and a method of charging the same.

In one aspect, the present disclosure provides a wireless charging mouse including a displacement detecting circuit, a first wireless power receiver, a second wireless power receiver, a conversion circuit, and a control circuit. The first wireless power receiver has a first wireless charging coil and the first wireless power receiver receives a wireless power supply of a first wireless power supply unit. The second wireless power receiver has a second wireless charging coil and the second wireless power receiver receives a wireless power supply of a second wireless power supply unit. The conversion circuit is electrically connected to the first wireless power receiver and the second wireless power receiver. The control circuit is electrically connected to the conversion circuit and the displacement detecting circuit. The conversion circuit receives a first power output by the first wireless power receiver and a second power output by the second wireless power receiver. The control circuit, according to the power status information that the conversion circuit receives from the first wireless power receiver and the second wireless power receiver, outputs a control signal to the conversion circuit, and the conversion circuit selectively receives at least one of the first power and the second power according to the control signal.

In another aspect, the present disclosure provides a method of charging a wireless charging mouse, and the wireless charging mouse has a first wireless power receiver and a second wireless power receiver. The method of charging the wireless charging mouse includes: receiving a wireless power supply of a first wireless power supply unit through a first wireless charging coil of the first wireless power receiver, receiving a wireless power supply of a second wireless power supply unit through a second wireless charging coil of the second wireless power receiver, receiving a first power output by the first wireless power receiver and a second power output by the second wireless power receiver through a conversion circuit of the wireless charging mouse, and selectively receiving at least one of the first power and the second power according to a power status information that the conversion circuit receives from the first wireless power receiver and the second wireless power receiver.

Therefore, multiple coils are disposed in the wireless charging mouse. The wireless charging mouse can detect a coil currently with the best induction, or supply power with all the coils simultaneously, so as to utilize multiple sets of coils to support different types of charging methods.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
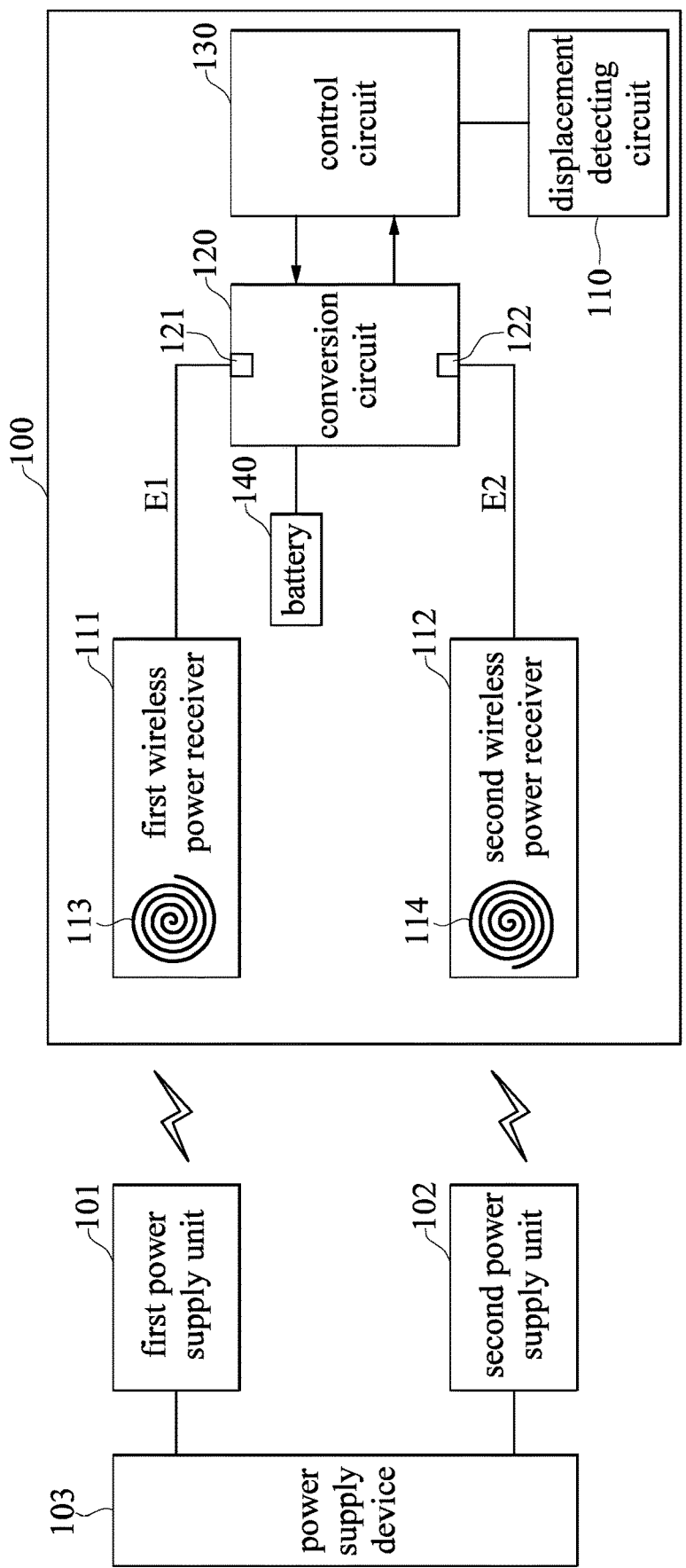
FIG. 1 is a system block diagram of a wireless charging system having a wireless charging mouse and a power supply unit of one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, a system block diagram of a wireless charging system having a wireless charging mouse and a power supply unit of one embodiment of the present disclosure is provided. The wireless charging system includes: a first power supply unit 101, a second power supply unit 102, a power supply device 103, and a wireless charging mouse 100. The first power supply unit 101 and the second power supply unit 102 can each be a wireless charging base or a charging pad, but the present disclosure is not limited thereto.

When the power supply device 103 is connected to the first power supply unit 101 and the second power supply unit 102, the power supply device 103 outputs a current to the first power supply unit 101 and the second power supply unit 102. The first power supply unit 101 and the second power supply unit 102 can convert the output current of the power supply device 103 into electromagnetic signals to emit through an internal wireless emitting circuit.

The wireless charging mouse 100 includes: a displacement detecting circuit 110, a first wireless power receiver 111, a second wireless power receiver 112, a conversion circuit 120, a control circuit 130, and/or a battery 140.

In one embodiment, the electromagnetic signals emitted by the first power supply unit 101 and the second power supply unit 102 can be received through the first wireless power receiver 111 and the second wireless power receiver 112, respectively, and the electromagnetic signals can then be converted into an output current corresponding to an output voltage of the first wireless power receiver 111 or the second wireless power receiver 112.

The first wireless power receiver 111 has a first wireless charging coil 113, and the first wireless power receiver 111 receives a wireless power supply of the first wireless power supply unit 101.

The second wireless power receiver 112 has a second wireless charging coil 114, and the first wireless power receiver 112 receives a wireless power supply of the first wireless power supply unit 102.

In one embodiment, the first wireless power receiver 111 is compatible with the Qi standard of the Wireless Power Consortium (WPC) and the second wireless power receiver 112 is compatible with the A4WP standard of the A4WP.

In one embodiment, the second wireless power receiver 111 is compatible with the Qi standard of the WPC and the first wireless power receiver 112 is compatible with the A4WP standard of the A4WP.

Since the output voltage of the first wireless power receiver 111 and the second wireless power receiver 112 can be unsuitable to be applied to the battery 140, a conversion through components (e.g. the conversion circuit 120) in the wireless charging mouse 100 is required to obtain an expected charging voltage and/or a charging current of the battery 140 of the wireless charging mouse 100. The components (e.g. the conversion circuit 120) can convert the output voltage of the first wireless power receiver 111 and the second wireless power receiver 112 to meet the requirement of the expected charging voltage and/or a charging current of the battery 140.

Referring to FIG. 1, the conversion circuit 120 is electrically connected to the first wireless power receiver 111 and the second wireless power receiver 112. For example, the conversion circuit 120 can include a first interface 121 which is connected to the first wireless power receiver 111, and a second interface 122 which is connected to the second wireless power receiver 112.

In one embodiment, the conversion circuit 120 can be an integrated circuit (IC). When the battery 140 is charging, the conversion circuit 120 can manage the charging voltage and/or the charging current.

The control circuit 130 is electrically connected to the conversion circuit 120 and the displacement detecting circuit 110. The conversion circuit 120 receives the first power E1 output by the first wireless power receiver 111, and the second power E2 output by the second wireless power receiver 112.

The wireless charging mouse 100 can include other electronic components. For example, the wireless charging mouse 100 can further include a detection module (e.g. a temperature-detecting module, or an acceleration-detecting module) connected to the conversion circuit 120, but the present disclosure is not limited thereto.

The battery 140 of the wireless charging mouse 100 is electrically connected to the conversion circuit 120 to provide power storage of the wireless charging mouse 100.

Figure 2:
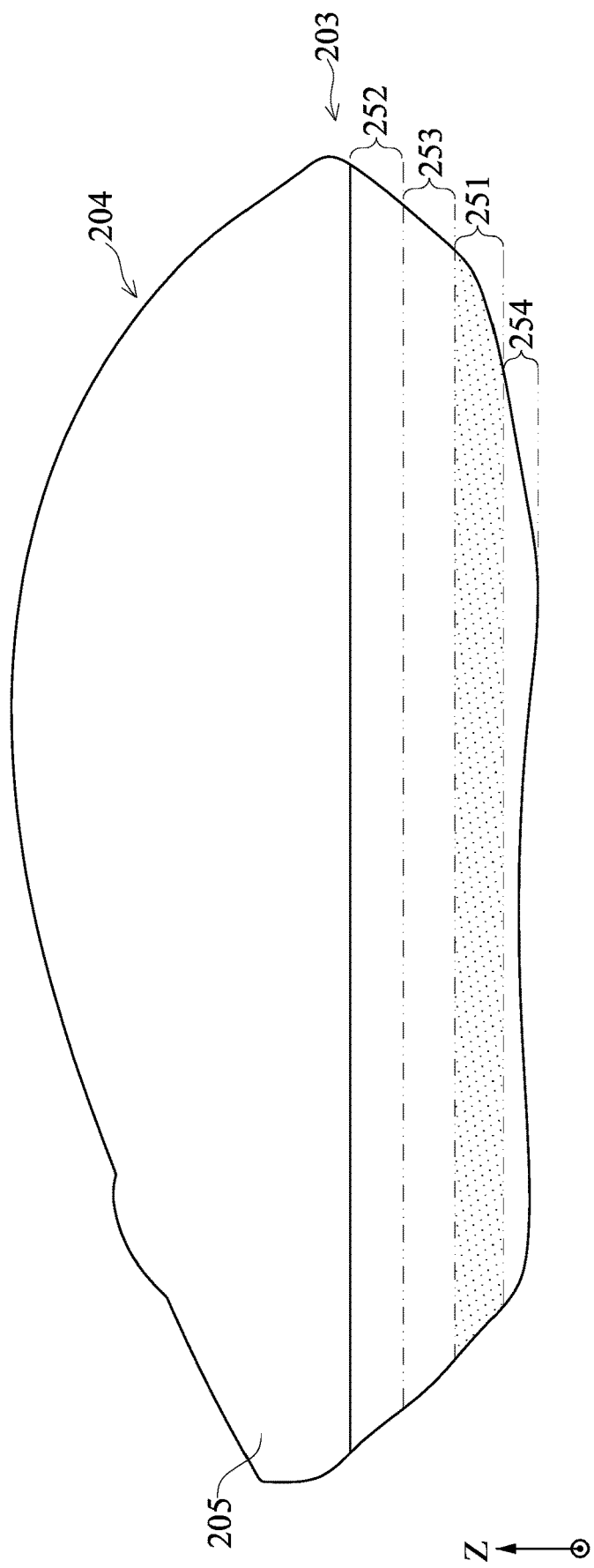
FIG. 2 is a configuration sectional view of a first wireless charging coil and a second wireless charging coil in a lower shell of a wireless charging mouse in one embodiment of the present disclosure.

Referring to FIG. 1 and FIG. 2, FIG. 2 is a configuration planar view of a first wireless charging coil 251 and a second wireless charging coil 252 in a lower shell 203 of a wireless charging mouse 100 in one embodiment of the present disclosure. The wireless charging mouse 100 includes a lower shell 203, an upper shell 204, the first wireless charging coil 251, the second wireless charging coil 252, an insulation board 253, and a magnetic plate 254. An accommodating space 205 is formed between the upper shell 204 and the lower shell 203. The insulation board 253 can be disposed between the first wireless charging coil 251 and the second wireless charging coil 252. The magnetic plate 254 is configured below the second wireless charging coil 252 to receive the electromagnetic energy emitted by the first power supply unit 101 and the second power supply unit 102.

More particularly, the first wireless charging coil 251 and the second wireless charging coil 252 is disposed in the lower shell 203. The first wireless charging coil 251 is disposed above the vertical axis (Z axis) of the lower shell 203 and the second wireless charging coil 252 is disposed below the vertical axis (Z axis) of the lower shell 203. The conversion circuit 120 and the control circuit 130 are disposed in the accommodating space 205. The first wireless power receiver 111 and the second wireless power receiver 112 receive the electromagnetic energy transferred by the first power supply unit 101 and the second power supply unit 102 respectively through the first interface 121 and the second interface 122, and then convert the electromagnetic energy into a first power E1 and a second power E2.

The conversion circuit 120 can obtain the power status information of the first wireless power receiver 111 and the second wireless power receiver 112 through detecting the current flowing through the first wireless power receiver 111 and the second wireless power receiver 112.

Specifically speaking, the conversion circuit 120 can obtain the power status information of the first wireless power receiver 111 and the second wireless power receiver 112 through using a resistor to detect the change of power consumption. In one embodiment of the present disclosure, the power status information can include information related to the number of wireless power receivers that can receive power, the current and the voltage that can be provided by the first power supply unit 101 and the second power supply unit 102, the present charge amount of each of the first wireless power receiver 111 and the second wireless power receiver 112, and the change of the charge amount.

In another embodiment, the conversion circuit 120 can detect the coil currently with the best induction to obtain the power status information of the first wireless power receiver 111 and the second wireless power receiver 112 through a firmware, but the present disclosure is not limited thereto.

The conversion circuit 120 receives the power status information of the first wireless power receiver 111 and the second wireless power receiver 112 through the above-mentioned operation. The control circuit 130 then receives the power status information sent by the conversion circuit 120 and outputs a corresponding control signal to the conversion circuit 120. The conversion circuit 120 selectively receives at least one of the first power E1 or the second power E2 according to the control signal, and outputs the power to the battery 140.

In one embodiment, the first wireless power receiver 111 is compatible with the Qi standard of the WPC and the second wireless power receiver 112 is compatible with the A4WP standard of the A4WP.

In one embodiment, the second wireless power receiver 111 is compatible with the Qi standard of the WPC and the first wireless power receiver 112 is compatible with the A4WP standard of the A4WP.

In one embodiment, when the control signal indicates that a ratio of the first power E1 to the second power E2 is greater than 1, the inducted current from the first wireless charging coil 251 is greater than the inducted current from the second wireless charging coil 252, and the conversion circuit 120 activates the first interface 121 and turns off the second interface 122. In one example, the first interface 121 and the second interface 122 can both be switches, and the first interface 121 and the second interface 122 can be controlled through turning the switches on or off. In other examples, other hardware or firmware can also be used to control the activation of the first interface 121 and the second interface 122, but the present disclosure is not limited thereto.

Through activating the first interface 121 and turning off the second interface 122, the conversion circuit 120 can receive the first power E1 of the first wireless power receiver 111, and stop receiving the second power E2 of the second wireless power receiver 112, thus receiving power only from the first power supply unit 101.

In one embodiment, when the control signal indicates that a ratio of the first power E1 to the second power E2 is less than 1, the inducted current from the second wireless charging coil 252 is greater than the inducted current from the first wireless charging coil 251, and the conversion circuit 120 turns off the first interface 121 and activates the second interface 122.

Through turning off the first interface 121 and activating the second interface 122, the conversion circuit 120 can receive the second power E2 of the second wireless power receiver 112, and stop receiving the first power E1 of the first wireless power receiver 111, thus receiving power only from the second power supply unit 102.

In one embodiment, when the control signal indicates that a ratio of the first power E1 to the second power E2 equals to 1, the inducted current from the first wireless charging coil 251 equals to the inducted current from the second wireless charging coil 252, and the conversion circuit 120 activates the first interface 121 and the second interface 122.

Through activating the first interface 121 and the second interface 122, the conversion circuit 120 can receive the first power E1 of the first wireless power receiver 111 and the second power E2 of the second wireless power receiver 112, thus receiving power from both the first power supply unit 101 and the second power supply unit 102.

Figure 3:
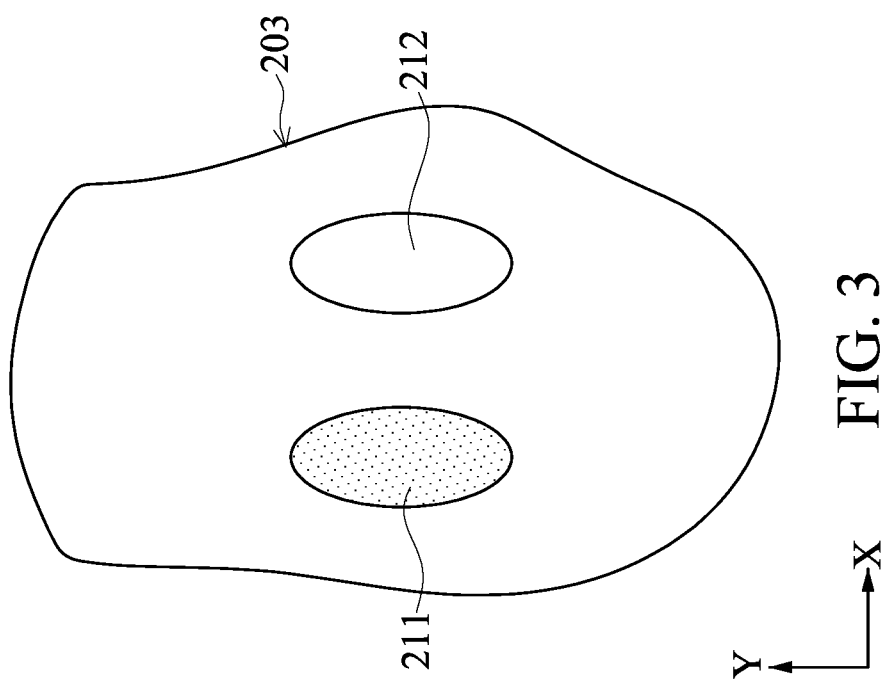
FIG. 3 is a configuration planar view of a first wireless charging coil and a second wireless charging coil in a lower shell of a wireless charging mouse in one embodiment of the present disclosure.

Reference is made to FIG. 2 and FIG. 3. FIG. 3 is a configuration planar view of a first wireless charging coil 211 and a second wireless charging coil 212 in the lower shell 203 of the wireless charging mouse 100 in one embodiment of the present disclosure. The first wireless charging coil 211 is disposed on one side of the horizontal plane of the lower shell 203, and the second wireless charging coil 212 is disposed on the other side of the horizontal plane of the lower shell 203. For example, the first wireless charging coil 211 is disposed on the negative X-axis side of the XY-plane of the lower shell 203, and the second wireless charging coil 212 is disposed on the positive X-axis side of the XY-plane of the lower shell 203.

Figure 4:
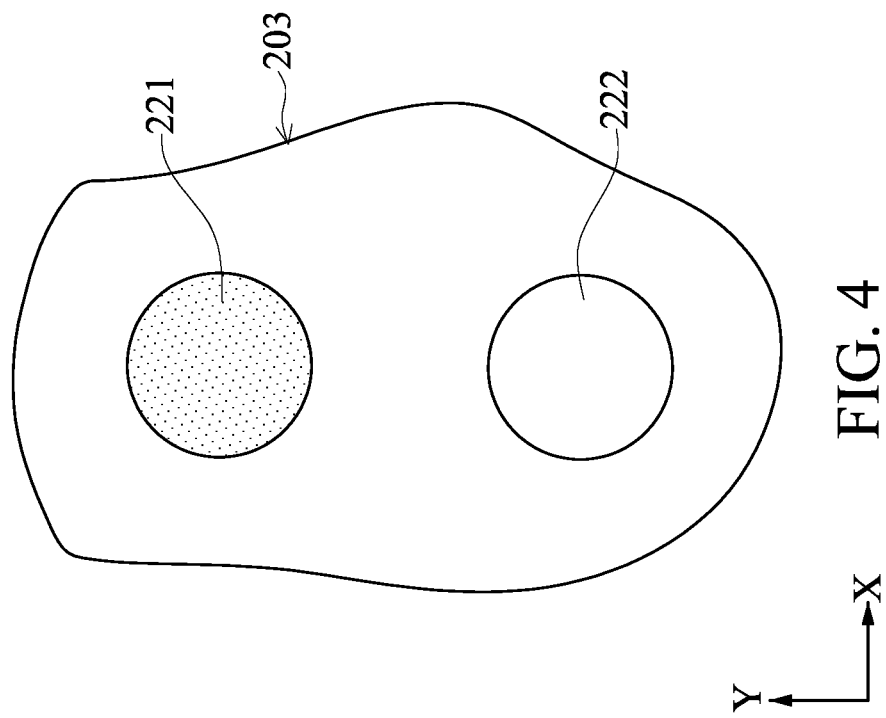
FIG. 4 is a configuration planar view of a first wireless charging coil and a second wireless charging coil in a lower shell of a wireless charging mouse in one embodiment of the present disclosure.

Reference is made to FIG. 2 and FIG. 4. FIG. 4 is a configuration planar view of a first wireless charging coil 221 and a second wireless charging coil 222 in the lower shell 203 of the wireless charging mouse 100 in one embodiment of the present disclosure. The first wireless charging coil 221 is disposed on one side of the horizontal plane of the lower shell 203, and the second wireless charging coil 222 is disposed on the other side of the horizontal plane of the lower shell 203. For example, the first wireless charging coil 221 is disposed on the positive Y-axis side of the XY-plane of the lower shell 203, and the second wireless charging coil 222 is disposed on the negative Y-axis side of the XY-plane of the lower shell 203.

Figure 5:
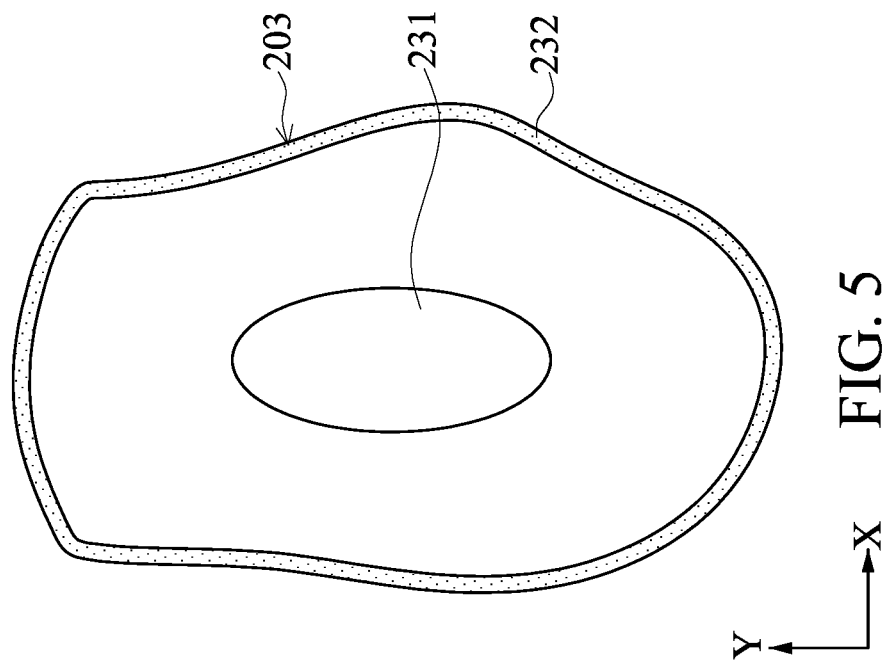
FIG. 5 is a configuration planar view of a first wireless charging coil and a second wireless charging coil in a lower shell of a wireless charging mouse in one embodiment of the present disclosure.

Reference is made to FIG. 2 and FIG. 5. FIG. 5 is a configuration planar view of a first wireless charging coil 231 and a second wireless charging coil 232 in the lower shell 203 of the wireless charging mouse 100 in one embodiment of the present disclosure. The second wireless charging coil 232 is disposed on a central position of the horizontal plane of the lower shell 203 of the wireless charging mouse, and the first wireless charging coil 231 is disposed on an outer peripheral edge of the horizontal plane of the lower shell 203.

Figure 6:
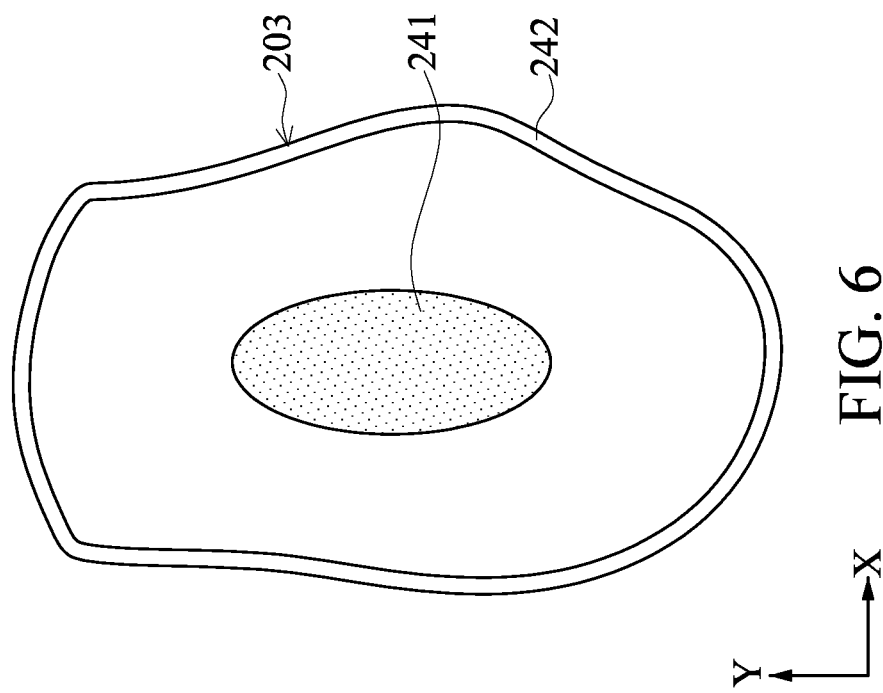
FIG. 6 is a configuration planar view of a first wireless charging coil and a second wireless charging coil in a lower shell of a wireless charging mouse in one embodiment of the present disclosure.

Reference is made to FIG. 2 and FIG. 6. FIG. 6 is a configuration planar view of a first wireless charging coil 241 and a second wireless charging coil 242 in the lower shell 203 of the wireless charging mouse 100 in one embodiment of the present disclosure. The first wireless charging coil 241 is disposed on the central position of the horizontal plane of the lower shell 203, and the first wireless charging coil 241 is disposed on the outer peripheral edge of the horizontal plane of the lower shell 203.

Reference is made to FIG. 3 to FIG. 6. A magnetic plate 254 can be disposed above the first charging coil and the second charging coil to obtain magnetic energy. More particularly, the material of the magnetic plate 254 of the above mentioned embodiments of the wireless charging mouse 100 can be one of the following: ferrite, cast iron, silicon steel sheet, or nickel zinc ferrite. The material of the insulation board 253 of the above mentioned embodiments of the wireless charging mouse 100 can be one of the following: mica, asbestos, marble, porcelain, glass, sulfur, shellac, resin, rubber, cotton yarn, paper, hemp, or rayon.

Figure 7:
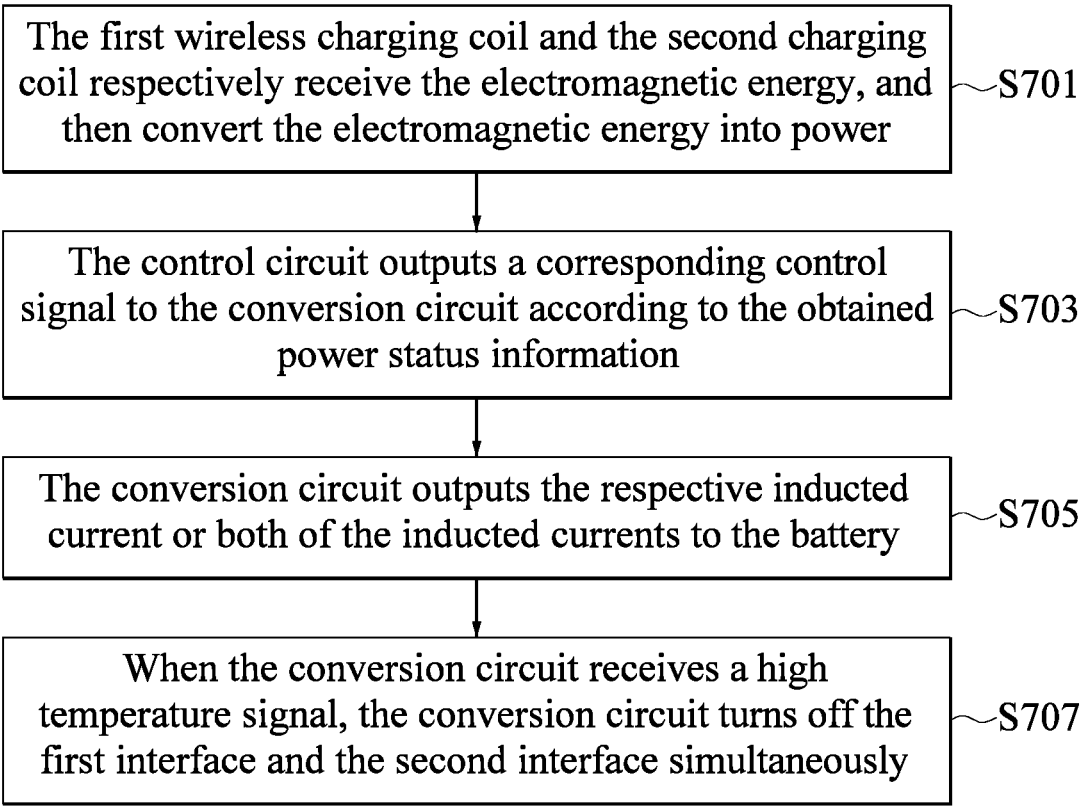
FIG. 7 is a flowchart of a wireless charging method of a wireless charging mouse in one embodiment of the present disclosure.

Reference is made to FIG. 1 and FIG. 7. FIG. 7 is a flowchart of a wireless charging method of the wireless charging mouse 100 in one embodiment of the present disclosure. In practical application, the charging method requires cooperative usage of a first power supply unit 101, a second power supply 102, and the wireless charging mouse 100.

As shown in the embodiment in FIG. 1, the first wireless power receiver 111 is compatible with the Qi standard of the WPC and the second wireless power receiver 112 is compatible with the A4WP standard of the A4WP. In some circumstances, the second wireless power receiver 111 is compatible with the Qi standard of the WPC and the first wireless power receiver 112 is compatible with the A4WP standard of the A4WP.

As shown in FIG. 7, the charging method includes steps as follows. In step S701, the first wireless power receiver 111 and the second wireless power receiver 112 receive the electromagnetic energy transferred by the first power supply unit 101 and the second power supply unit 102 respectively through the first charging coil 112 and the second charging coil 113, and then convert the electromagnetic energy into a first power E1 and a second power E2.

In step S703, the control circuit 130 obtains the power status information of the first wireless power receiver 111 and the second wireless power receiver 112, and outputs a corresponding control signal to the conversion circuit 120.

In step S705, the conversion circuit 120 outputs the respective inducted current or both of the inducted currents converted from the electromagnetic energy of the first wireless charging coil 113 and the electromagnetic energy of the second wireless charging coil 114 to the battery 140, according to the control signal.

In another embodiment, the above-mentioned inducted current can be output to other electronic components of the wireless charging mouse 100 through the conversion circuit 120.

In one embodiment, when the control signal indicates that a ratio of the first power E1 to the second power E2 is greater than 1, the inducted current from the first wireless charging coil 113 is greater than the inducted current from the second wireless charging coil 114, and the conversion circuit 120 activates the first interface 121 and turns off the second interface 122. Therefore, the conversion circuit 120 can receive the first power E1 of the first wireless power receiver 111 and not receive the second power E2 of the second wireless power receiver 112, thus receiving power only from the first power supply unit 101.

In one embodiment, when the control signal indicates that a ratio of the first power E1 to the second power E2 is less than 1, the inducted current from the second wireless charging coil 114 is greater than the inducted current from the first wireless charging coil 113, and the conversion circuit 120 turns off the first interface 121 and activates the second interface 122. Therefore, the conversion circuit 120 can receive the second power E2 of the second wireless power receiver 112, and not receive the first power E1 of the first wireless power receiver 111, thus receiving power only from the second power supply unit 102.

In one embodiment, when the control signal indicates that a ratio of the first power E1 to the second power E2 equals to 1, the inducted current from the first wireless charging coil 113 equals to the inducted current from the second wireless charging coil 114, and the conversion circuit 120 activates the first interface 121 and the second interface 122. Therefore, the conversion circuit 120 can receive the first power E1 of the first wireless power receiver 111 and the second power E2 of the second wireless power receiver 112, thus receiving power from both the first power supply unit 101 and the second power supply unit 102.

In step S707, when the conversion circuit 120 receives a high temperature signal from a detection module of the wireless charging mouse 100, the conversion circuit 120 turns off the first interface 121 and the second interface 122. Therefore, converted currents of the electromagnetic energy received respectively by the first wireless charging coil 113 and the second wireless charging coil 114 are not able to be output to the battery 140 or other electronic components of the wireless charging mouse 100.

In one embodiment, the conversion circuit 120 can control the shift between the first wireless charging coil 113 along with the second wireless charging coil 114 and the battery 140 or other electronic components of the wireless charging mouse 100, according to the temperature of the battery 140. For example, when the temperature is higher than the high-temperature threshold (e.g. 50° C.), the conversion circuit 120 can turn off the first interface 121 and the second interface 122 to prevent energy loss and heating problems caused by the conversion circuit 120 converting the output current and/or the output voltage of the first wireless charging coil 113 and the second wireless charging coil 114.

In conclusion, the wireless charging mouse having multiple coils disposed therein is disclosed in the present disclosure. The wireless charging mouse is able to detect a coil currently with the best induction, or supply power with all the coils simultaneously, so as to utilize multiple sets of coils to support different types of charging methods. Users can choose charging methods between charging while using and fast charging through having the wireless charging mouse remain stationary. Users can choose whether to use the battery disposed in the wireless charging mouse or not. When choosing not to use the battery, power can still be obtained through charging while using the wireless charging mouse. When choosing to use the battery, but the battery is out of power, the charging while using function enables the usage of the wireless charging mouse, and charges the battery. When using the battery, fast charging becomes available, since the wireless charging mouse has wireless power receivers compatible with the Qi standard.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wireless charging mouse, comprising:
a displacement detecting circuit;
a first wireless power receiver having a first wireless charging coil, and the first wireless power receiver receiving a wireless power supply of a first wireless power supply unit;
a second wireless power receiver having a second wireless charging coil, and the second wireless power receiver receiving a wireless power supply of a second wireless power supply unit;
a conversion circuit, wherein the conversion circuit includes a first interface and a second interface, the first interface is connected to the first wireless power receiver, the second interface is connected to the second wireless power receiver, the conversion circuit receives power status information of the first wireless power receiver and the second wireless power receiver;
a control circuit electrically connected to the conversion circuit and the displacement detecting circuit; and
a battery connected to the conversion circuit;
wherein the control circuit receives the power status information sent by the conversion circuit and outputs a control signal to the conversion circuit according to the power status information, and the conversion circuit selectively activates at least one of the first interface and the second interface according to the control signal so as to selectively receive at least one of the first power and the second power.

2. The wireless charging mouse according to claim 1, wherein the first wireless power receiver is compatible with the Qi standard of the Wireless Power Consortium (WPC), the second wireless power receiver is compatible with the A4WP standard of the Alliance for Wireless Power (A4WP), and the first interface and the second interface are both switches.

3. The wireless charging mouse according to claim 1, wherein when the control signal indicates that a ratio of the first power to the second power is greater than 1, the conversion circuit receives the first power and stops receiving the second power.

4. The wireless charging mouse according to claim 1, wherein when the control signal indicates that a ratio of the first power to the second power is less than 1, the conversion circuit stops receiving the first power and receives the second power.

5. The wireless charging mouse according to claim 1, wherein when the control signal indicates that a ratio of the first power to the second power equals to 1, the conversion circuit receives the first power and the second power.

6. The wireless charging mouse according to claim 1, wherein the first wireless charging coil is disposed on one side of a horizontal plane of a lower shell of the wireless charging mouse, and the second wireless charging coil is disposed on another side of the horizontal plane of the lower shell of the wireless charging mouse, and wherein a magnetic plate is disposed above the first wireless charging coil or the second wireless charging coil.

7. The wireless charging mouse according to claim 1, wherein the first wireless charging coil is disposed on a central position of a horizontal plane of a lower shell of the wireless charging mouse, and the second wireless charging coil is disposed on the outer peripheral edge of the horizontal plane of the lower shell of the wireless charging mouse, and wherein a magnetic plate is disposed above the first wireless charging coil or the second wireless charging coil.

8. The wireless charging mouse according to claim 1, wherein the first wireless charging coil is disposed below a vertical axis of a lower shell of the wireless charging mouse, the second wireless charging coil is disposed above the vertical axis of the lower shell of the wireless charging mouse, and an insulation board is disposed between the first wireless charging coil and the second wireless charging coil, and wherein a magnetic plate is disposed under the second wireless charging coil.

9. A method of charging a wireless charging mouse, the wireless charging mouse including a first wireless power receiver, a second wireless power receiver, a conversion circuit, a control circuit and a battery connected to the conversion circuit, the method of charging comprising:
receiving a wireless power supply of a first wireless power supply unit through the first wireless power receiver of a first wireless charging coil;
receiving a wireless power supply of a second wireless power supply unit through the second wireless power receiver of a second wireless charging coil;
receiving power status information of the first wireless power receiver and the second wireless power receiver by the conversion circuit;
outputting a control signal, by the control circuit, to the conversion circuit according the power status information;
selectively activating at least one of a first interface of the conversion circuit and a second interface of the conversion circuit according to the control signal; and
selectively receiving at least one of the first power and the second power.

10. The wireless charging method according to claim 9, wherein the first wireless power receiver is compatible with the Qi standard of the WPC, the second wireless power receiver is compatible with the A4WP standard of the A4WP, and the first interface and the second interface are both switches.

11. The wireless charging method according to claim 9, wherein when the control signal indicates that a ratio of the first power to the second power is greater than 1, the conversion circuit receives the first power and stops receiving the second power.

12. The wireless charging method according to claim 9, wherein when the control signal indicates that a ratio of the first power to the second power is less than 1, the conversion circuit stops receiving the first power and receives the second power.

13. The wireless charging method according to claim 9, wherein when the control signal indicates that a ratio of the first power to the second power equals to 1, the conversion circuit receives the first power and the second power.

14. The wireless charging method according to claim 9, further including: when the conversion circuit receives a high temperature signal, the conversion circuit stops receiving the first power or the second power.

* * * * *